United States Patent
Kaneda et al.

(10) Patent No.: US 9,464,183 B2
(45) Date of Patent: Oct. 11, 2016

(54) RUBBER COMPOSITION AND PNEUMATIC TIRE USING THE SAME

(75) Inventors: Kazunori Kaneda, Sayama (JP); Yoshinori Kuriya, Kodaira (JP); Kazuya Tsukamoto, Ichihara (JP); Nobumasa Arashiba, Tokyo (JP); Akinori Nagatomo, Omuta (JP); Kouki Oogaki, Otake (JP); Takeshi Kobayashi, Omuta (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/035,347

(22) Filed: Feb. 25, 2011

(65) Prior Publication Data
US 2011/0146886 A1    Jun. 23, 2011

Related U.S. Application Data

(62) Division of application No. 10/598,688, filed as application No. PCT/JP2005/003908 on Mar. 7, 2005, now abandoned.

(30) Foreign Application Priority Data

Mar. 12, 2004    (JP) .................. 2004-070663
Mar. 12, 2004    (JP) .................. 2004-070892

(51) Int. Cl.
*B60C 1/00*    (2006.01)
*B60C 9/02*    (2006.01)
(Continued)

(52) U.S. Cl.
CPC .............. *C08K 5/098* (2013.01); *B60C 1/00* (2013.01); *C08K 5/134* (2013.01); *Y10T 152/1081* (2015.01)

(58) Field of Classification Search
CPC ......... B60C 1/00; B60C 1/0041; B60C 9/02; B29D 30/00; B29D 30/06
See application file for complete search history.

(56) References Cited

U.S. PATENT DOCUMENTS 3,922,250 A * 11/1975 Cleary ............... C08G 63/6886
                                                              528/173
4,076,668 A    2/1978 Kaneda et al.
(Continued)

FOREIGN PATENT DOCUMENTS

EP        379055 A2    7/1990
EP    0 434 596 A2    6/1991
(Continued)

*Primary Examiner* — Justin Fischer
(74) *Attorney, Agent, or Firm* — Sughrue Mion, PLLC

(57) ABSTRACT

This invention provides a rubber composition comprising 1-10 parts by mass of sulfur and 0.1-10 parts by mass of a compound represented by the following general formula (1) or a composition containing the compound as a main component based on 100 parts by mass of a rubber component as well as a pneumatic tire in which at least one of a carcass (4) and a belt (6) includes a layer composed of steel cords covered with a coating rubber, characterized in that the above rubber composition is used as the coating rubber covering the steel cords in at least one of the carcass (4) and the belt (6):

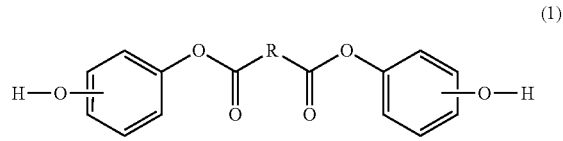

(1)

(wherein R represents a divalent aliphatic group having a carbon number of 1-16 or a divalent aromatic group).

2 Claims, 1 Drawing Sheet

(51) Int. Cl.
 *B60C 9/18* (2006.01)
 *B29D 30/00* (2006.01)
 *C08K 5/098* (2006.01)
 *C08K 5/134* (2006.01)

(56) References Cited

U.S. PATENT DOCUMENTS 4,081,384 A   3/1978  Pracht
5,166,267 A * 11/1992 Cohn .................. C08J 3/005
                                                   525/173

2004/0127616 A1  7/2004  Wentworth et al.

FOREIGN PATENT DOCUMENTS

| EP | 1022306 A1 | 7/2000 |
| EP | 1145871 A2 | 10/2001 |
| JP | 55-152730 A | 11/1980 |
| JP | 7-118621 A | 5/1995 |
| JP | 2001-234140 A | 8/2001 |
| JP | 2002-338739 A | 11/2002 |

* cited by examiner

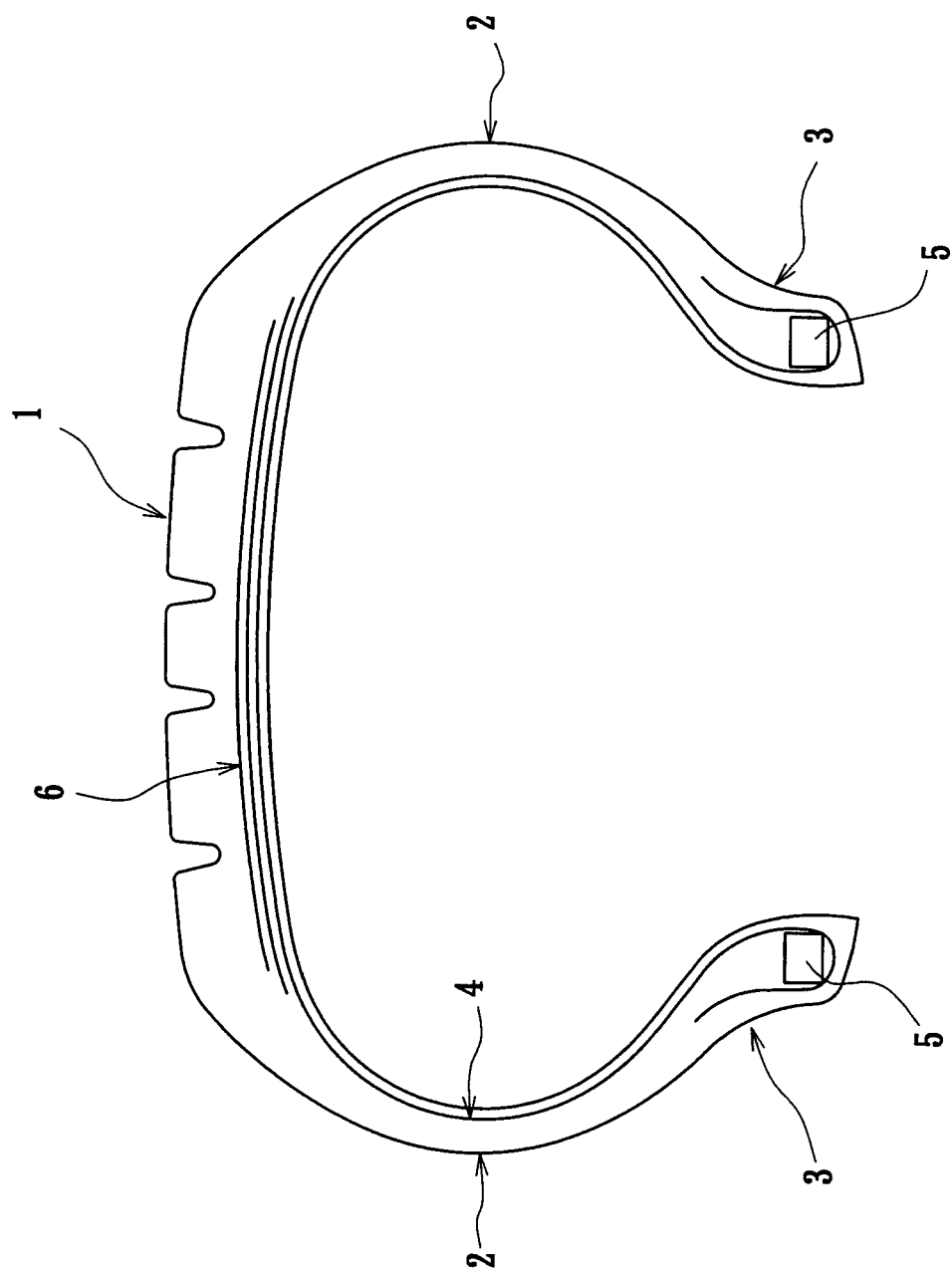

US 9,464,183 B2

RUBBER COMPOSITION AND PNEUMATIC TIRE USING THE SAME

CROSS REFERENCE TO RELATED APPLICATIONS

This is a divisional of U.S. application Ser. No. 10/598,688 filed May 14, 2007 which is a 371 of International Application PCT/JP2005/003908 filed Mar. 7, 2005, which claims priority to Japanese Application No. 2004-70,663 filed Mar. 12, 2004 and to Japanese Application No. 2004-70,892 filed Mar. 12, 2004, the above-noted applications incorporated herein by reference in their entirety.

TECHNICAL FIELD

This invention relates to a rubber composition having an excellent adhesion durability to a metal reinforcing material such as a steel cord or the like used for rubber products such as a pneumatic tire, an industrial belt and the like as well as a pneumatic tire using the same. More particularly, the invention relates to a rubber composition for a coating rubber of a metal reinforcing material, which is good in the processability during the compounding of rubber, less susceptible to mixing and storing conditions, small in the change with the lapse of time and good in the initial adhesion and humidity-aged adhesion to the metal reinforcing material as well as a pneumatic tire having an improved durability by using the above rubber composition in at least one of a carcass and a belt, in which at least one carcass ply and/or at least one belt layer is a steel cord layer, to suppress moist heat deterioration thereof.

BACKGROUND ART

Since a steel radial tire was developed by Michelin Corporation in the last half of 1940s, a steel cord reinforced pneumatic tire using steel cords as a reinforcing material for at least one of a carcass and a belt, increases its share of the market. Recently, along with a transition to a belted bias tire and a radial tire, the steel cord reinforced pneumatic tire significantly increases its share of the market and rapidly increases its share in a tire for a truck. In rubber products particularly requiring the strength such as conveyor belts, hoses and the like in addition to the steel cord reinforced pneumatic tire is used a composite material formed by covering a metal reinforcing material such as a steel cord with a rubber composition for the purpose of reinforcing rubber to improve the strength and durability.

In order that the rubber-metal composite material develops a high reinforcing effect to provide a reliability, a stable adhesion not depending on conditions of mixing, compounding, storage and so on is required between the rubber and the metal reinforcing material. In order to obtain such a composite material, there is widely used a so-called direct vulcanization adhesion, in which the metal reinforcing materials such as steel cords or the like plated with zinc, brass or the like are embedded in the rubber composition containing sulfur and adhered thereto at the same time as the vulcanization of rubber during the vulcanization by heating. Until now, there are made various investigations for improving the adhesion between the rubber and the metal reinforcing material in the direct vulcanization adhesion, particularly the humidity-aged adhesion.

For example, there is reported a rubber composition compounded with a resorcin or a resorcin-formaldehyde resin (hereinafter abbreviated as "RF resin") obtained by the condensation of resorcin and formalin for the purpose of improving the humidity-aged adhesion (JP-A-2001-234140), in which the humidity-aged adhesion between the steel cord and the rubber is exponentially improved by compounding the RF resin.

However, the resorcin or the RF resin is poor in the compatibility with rubber because the polarity is very high, and the precipitation of the resorcin or the RF resin or so-called blooming is caused in accordance with conditions of mixing, compounding, storage and so on, so that there is a fear of damaging an appearance of the rubber product. Also, when the rubber composition is stored over a long time of period ranging from the compounding to the vulcanization adhesion, a problem of deteriorating the adhesion is caused by blooming, so that it is necessary to rapidly conduct the vulcanization adhesion of the rubber composition containing the resorcin or the RF resin, which may damage the productivity of the rubber product.

Furthermore, there is reported an adhesive material made from a mixed polyester having a resorcin skeleton with a weight average molecular weight of 3000-45000 (JP-A-7-118621). Although the mixed polyester having a high molecular weight is more compatible with the rubber as compared with the RF resin, the compatibility can not still be satisfied. Moreover, when the mixed polyester having a high molecular weight is compounded with rubber, the viscosity of the compounded rubber is increased to cause a problem of lowering the processability, and the humidity-aged adhesion is not sufficient.

DISCLOSURE OF THE INVENTION

It is, therefore, an object of the invention to solve the above-mentioned problems of the conventional techniques and to provide a rubber composition capable of developing a stable adhesion, wherein the blooming observed in the compounding with the resorcin or the RF resin is suppressed while maintaining the processability and high humidity-aged adhesion at the time of compounding with rubber component and the change with the lapse of time is small.

It is another object of the invention to provide a pneumatic tire in which a rubber composition having a humidity-aged adhesion equal to that of the rubber composition compounded with the resorcin or the RF resin and a viscosity lower than that of said rubber composition, and suppressing the blooming observed in the compounding with the resorcin or the RF resin, and being small in the change with the lapse of time and capable of developing a stable adhesion is applied as a coating rubber to a steel cord layer in at least one of a carcass and a belt to provide not only an excellent processability during manufacturing but also a high durability and a stable adhesion between steel cords and the coating rubber.

The inventors have made various studies in order to achieve the above objects, and found that a rubber composition formed by compounding a predetermined amount of a compound having a specific structure or a composition containing such a compound as a main component into a rubber component maintains a humidity-aged adhesion and processability equal to those of the rubber composition compounded with the resorcin or RF resin and suppresses the occurrence of the blooming as a problem of the latter rubber composition and has a stable adhesion not dependent on conditions of compounding, storage and so on, and further found that when such a rubber composition is used as a coating rubber of a steel cord layer in at least one of a carcass and a belt, the processability in the manufacture of the tire is improved as compared with the use of the rubber composition compounded with the resorcin or RF resin, and also the resulting tire has a high durability because the adhesion stability between steel cords and the coating rubber is high, and as a result the invention has been accomplished.

That is, the rubber composition according to the invention is characterized by comprising 1-10 parts by mass of sulfur (B) and 0.1-10 parts by mass of a compound (C1) represented by the following general formula (1) based on 100 parts by mass of a rubber component (A):

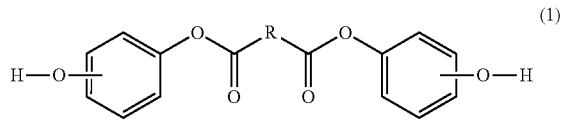
(1)

(wherein R is a divalent aliphatic group having a carbon number of 1-16 or a divalent aromatic group).

In a preferable embodiment of the rubber composition according to the invention, the compound represented by the general formula (1) is a compound represented by the following general formula (2):

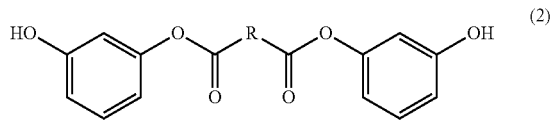
(2)

(wherein R represents a divalent aliphatic group having a carbon number of 1-16 or a divalent aromatic group).

Also, another rubber composition according to the invention is characterized by comprising 1-10 parts by mass of sulfur (B) and 0.1-10 parts by mass of a composition (C2) containing 60-100 wt % of the compound represented by the general formula (2), 0-20 wt % of a compound represented by the following general formula (3) in which n is 2, 0-10 wt % of a compound represented by the following general formula (3) in which n is 3 and 0-10 wt % of a compound represented by the following general formula (3) in which n is 4-6 (with the proviso that the composition does not encompass a pure material which consists of 100 wt % of the compound represented by the general formula (2)), based on 100 parts by mass of a rubber component (A):

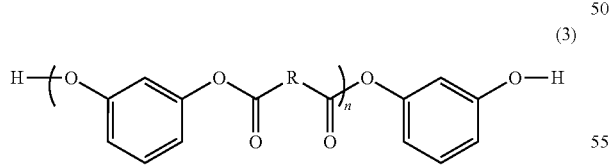
(3)

(wherein R is a divalent aliphatic group having a carbon number of 1-16 or a divalent aromatic group, and n is an integer of 2-6).

The rubber composition according to the invention is preferable to further contain 0.03-1 part by mass as a cobalt amount of an organic acid cobalt salt based on 100 parts by mass of the rubber component.

In another preferable embodiment of the rubber composition according to the invention, the rubber component is at least one of natural rubber and polyisoprene rubber.

In the other preferable embodiment of the rubber composition according to the invention, the rubber component comprises not lower than 50 mass % of natural rubber (NR) and the remainder being a synthetic rubber.

Furthermore, the invention provides an adhesion improver. That is, the first adhesion improver according to the invention is characterized by comprising the compound represented by the general formula (2) and the second adhesion improver according to the invention is characterized by comprising the composition containing 60-100 wt % of the compound represented by the general formula (2), 0-20 wt % of a compound represented by the general formula (3) in which n is 2, 0-10 wt % of a compound represented by the general formula (3) in which n is 3 and 0-10 wt % of a compound represented by the following formula (3) in which n is 4-6.

Moreover, the pneumatic tire according to the invention comprises a carcass composed of at least one carcass ply and a belt composed of at least one belt layer disposed on the carcass outward in a radial direction of the tire, wherein at least one of the carcass and the belt includes a layer containing steel cords covered with a coating rubber, and is characterized in that the above-mentioned rubber composition is used in the coating rubber covering steel cords in at least one of the carcass and the belt.

According to the invention, there can be provided a rubber composition in which the changes of the initial adhesion and the humidity-aged adhesion to the metal reinforcing material such as a steel cord or the like with the lapse of time is suppressed while maintaining the processability and high humidity-aged adhesion in the compounding.

Also, according to the invention, there can be provided a pneumatic tire including a layer composed of steel cords covered with a coating rubber in at least one of a carcass and a belt, in which since the above rubber composition is applied as a coating rubber covering steel cords for at least one of the carcass and the belt, the processability in the manufacture of the tire is high because the viscosity of the rubber composition is low but also the durability is high because the adhesion durability and adhesion stability between the steel cord and the coating rubber are high.

BRIEF DESCRIPTION OF THE DRAWINGS

FIG. 1 is a cross-sectional view of an embodiment of the pneumatic tire according to the invention.

BEST MODE FOR CARRYING OUT THE INVENTION

The invention will be described in detail below. The rubber composition of the invention is characterized by comprising 1-10 parts by mass of sulfur and 0.1-10 parts by mass of the compound represented by the general formula (1) based on 100 parts by mass of the rubber component.

The rubber component in the rubber composition according to the invention is not particularly limited as far as it has a rubber elasticity and may include any known rubbers such as natural rubber and synthetic rubbers, for example, vinyl aromatic hydrocarbon/conjugated diene copolymer, polyisoprene rubber, butadiene rubber, butyl rubber, halogenated butyl rubber, ethylene-propylene rubber and so on. These rubber components may be used alone or in a combination of two or more. In view of adhesion properties to a metal reinforcing material and fracture properties of the rubber composition, the rubber component is preferable to be at least one of natural rubber and polyisoprene rubber or comprise not lower than 50 mass % of natural rubber and the remainder being a synthetic rubber.

Sulfur compounded in the rubber composition according to the invention is not particularly limited, but sulfur powder is commonly used. The amount of sulfur compounded in the rubber composition according to the invention is within a range of 1-10 parts by mass, preferably a range of 3-8 parts by mass based on 100 parts by mass of the rubber component. When the amount of sulfur compounded is not less than 1 part by mass, the adhesion to the metal reinforcing material such as a steel cord or the like is preferable, while when it is not more than 10 parts by mass, the formation of an extra adhesion layer is suppressed and the adhesion is not deteriorated.

In the compound of the general formula (1) compounded in the rubber composition according to the invention, R in the formula is a divalent aliphatic group having a carbon number of 1-16 or a divalent aromatic group. As the compound represented by the general formula (1) are mentioned, for example, compounds represented by the general formula (2). R in the general formula (2) is the same meaning as R in the general formula (1).

As the divalent aliphatic group having a carbon number of 1-16 are mentioned, for example, linear or branched alkylene groups such as methylene group, ethylene group, butylene group, isobutylene group, octylene group, 2-ethylhexylene group and the like; linear or branched alkenylene groups such as vinylene group (ethenylene group), butenylene group, octenylene group and the like; a substituted alkylene or alkenylene group in which hydrogen atom in the above-mentioned alkylene or alkenylene group is substituted with a hydroxyl group, an amino group or the like; and a cycloaliphatic group such as cyclohexylene group or the like. As the divalent aromatic group are mentioned phenylene group optionally substituted, naphthylene group optionally substituted, and so on. Among them, an alkylene group having a carbon number of 2-10 and phenylene group are preferable considering easiness of availability and the like, and ethylene group, butylene group, octylene group and phenylene group are particularly preferable.

As a concrete example of the compound of the general formula (1) compounded in the rubber composition according to the invention are mentioned bis(2-hydroxyphenyl) malonate, bis(2-hydroxyphenyl) succinate, bis(2-hydroxyphenyl) fumarate, bis(2-hydroxyphenyl) maleate, bis(2-hydroxyphenyl) malate, bis(2-hydroxyphenyl) itaconate, bis (2-hydroxyphenyl) citraconate, bis(2-hydroxyphenyl) adipate, bis(2-hydroxyphenyl) tartrate, bis(2-hydroxyphenyl) azelate, bis(2-hydroxyphenyl) sebacate, bis(2-hydroxyphenyl) cyclohexanedicarboxylate, bis(2-hydroxyphenyl) terephthalate, bis(2-hydroxyphenyl) isophthalate, bis(3-hydroxyphenyl) malonate, bis(3-hydroxyphenyl) succinate, bis (3-hydroxyphenyl) fumarate, bis(3-hydroxyphenyl) maleate, bis(3-hydroxyphenyl) malate, bis(3-hydroxyphenyl) itaconate, bis(3-hydroxyphenyl) citraconate, bis(3-hydroxyphenyl) adipate, bis(3-hydroxyphenyl) tartrate, bis(3-hydroxyphenyl) azelate, bis(3-hydroxyphenyl) sebacate, bis (3-hydroxyphenyl) cyclohexanedicarboxylate, bis(3-hydroxyphenyl) terephthalate, bis(3-hydroxyphenyl) isophthalate, bis(4-hydroxyphenyl) malonate, bis(4-hydroxyphenyl) succinate, bis(4-hydroxyphenyl) fumarate, bis (4-hydroxyphenyl) maleate, bis(4-hydroxyphenyl) itaconate, bis(4-hydroxyphenyl) citraconate, bis(4-hydroxyphenyl) adipate, bis(4-hydroxyphenyl) tartrate, bis (4-hydroxyphenyl) azelate, bis(4-hydroxyphenyl) sebacate, bis(4-hydroxyphenyl) cyclohexanedicarboxylate, bis(4-hydroxyphenyl) terephthalate, bis(4-hydroxyphenyl) isophthalate and the like.

Among them are preferable bis(3-hydroxyphenyl) malonate, bis(3-hydroxyphenyl) succinate, bis(3-hydroxyphenyl) fumarate, bis(3-hydroxyphenyl) maleate, bis(3-hydroxyphenyl) malate, bis(3-hydroxyphenyl) itaconate, bis (3-hydroxyphenyl) citraconate, bis(3-hydroxyphenyl) adipate, bis(3-hydroxyphenyl) tartrate, bis(3-hydroxyphenyl) azelate, bis(3-hydroxyphenyl) sebacate, bis(3-hydroxyphenyl) cyclohexanedicarboxylate, bis(4-hydroxyphenyl) terephthalate and bis(4-hydroxyphenyl) isophthalate. Particularly, bis(3-hydroxyphenyl) succinate, bis(3-hydroxyphenyl) adipate bis(3-hydroxyphenyl) sebacate, bis(4-hydroxyphenyl) terephthalate, and bis(4-hydroxyphenyl) isophthalate are preferable.

The production method of the compound represented by the general formula (1) is not particularly limited, but is produced, for example, by reacting a dicarboxylic acid halide represented by the following general formula (4):

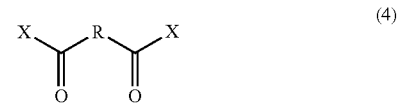

(wherein R is a divalent aliphatic group having a carbon number of 1-16 or a divalent aromatic group, and X is a halogen atom) with a compound represented by the following general formula (5):

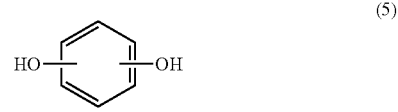

in the presence or absence of a base.

In the general formula (4), R is the same meaning as R in the general formula (1), and X is a halogen atom. As the halogen atom, a chlorine atom and a bromine atom are preferable.

As the compound represented by the general formula (4) are mentioned aliphatic dicarboxylic acid dichlorides such as malonyl dichloride, succinyl dichloride, fumaroyl dichloride, maleoyl dichloride, glutaryl dichloride, adipoyl dichloride, suberoyl dichloride, azelaoyl dichloride, sebacoyl dichloride, 1,10-decanedicarbonyl dichloride, 1,12-dodecanedicarbonyl dichloride, 1,16-hexadecanedicarbonyl dichloride and the like; cycloaliphatic dicarboxylic acid dichlorides such as cyclohexanedicarbonyl dichloride, cyclohexenedicarbonyl dichloride and the like; aromatic dicarboxylic acid dichlorides such as terephthaloyl dichloride, isophthaloyl dichloride and the like; aliphatic dicarboxylic acid dibromides such as malonyl dibromide, succinyl dibromide, fumaroyl dibromide, maleoyl dibromide, glutaryl dibromide, adipoyl dibromide, suberoyl dibromide, azelaoyl dibromide, sebacoyl dibromide, 1,10-decanedicarbonyl dibromide, 1,12-dodecanedicarbonyl dibromide, 1,16-hexadecanedicarbonyl dibromide and the like; cycloaliphatic dicarboxylic acid dibromides such as cyclohexanedicarbonyl dibromide, cyclohexenedicarbonyl dibromide and the like; and aromatic dicarboxylic acid dibromides such as terephthaloyl dibromide, isophthaloyl dibromide and the like. Among them, malonyl dichloride, succinyl dichloride, adipoyl dichloride, azelaoyl dichloride, sebacoyl dichloride, terephtaloyl dichloride, isophtaloyl dichloride, malonyl dibromide, succinyl dibromide, adipoyl dibromide, azelaoyl dibromide, sebacoyl dibromide, terephtaloyl dibromide and isophtaloyl dibromide are preferable.

On the other hand, as the compound represented by the general formula (5) are mentioned catechol, resorcin and hydroquinone.

As the base used in the reaction of the compound represented by the general formula (4) with the compound represented by the general formula (5) are usually used organic bases such as pyridine, β-picoline, N-methylmorpholine, dimethylaniline, diethylaniline, trimethylamine, triethylamine, tributylamine and the like.

When the compound represented by the general formula (4) is reacted with the compound represented by the general formula (5), a molar ratio of the compound of the general formula (4) to the compound of the general formula (5) is usually 1:4-1:30.

When the compound represented by the general formula (4) is reacted with the compound represented by the general formula (5), a solvent may be used for the purpose of dissolving the starting materials. As the solvent may be used the above-mentioned organic bases as it is and other organic solvents not obstructing the reaction. As the latter solvent is mentioned ether such as dimethyl ether, dioxane or the like.

When the compound represented by the general formula (4) is reacted with the compound represented by the general formula (5), the reaction temperature is usually −20° C.-120° C.

The compound of the general formula (1) obtained by the above reaction can be isolated from the reaction mixture by a well-known method. There are mentioned a method wherein the organic base and the compound represented by the general formula (5) used for the reaction and further an organic solvent if it is used for the reaction are evaporated and dried by an operation of a vacuum distillation or the like, a method wherein a poor solvent for the compound represented by the general formula (1) is added to the reaction mixture to conduct re-precipitation, a method wherein a water and a water immiscible organic solvent are added to the reaction mixture to extract into an organic phase, and so on. Moreover, in some cases, it may be purified by recrystallization.

As the poor solvent for the compound represented by the general formula (1) is usually used a water. Moreover, as the water immiscible organic solvent are used esters such as ethyl acetate, butyl acetate and the like; and ketones such as methyl isobutyl ketone, diisobutyl ketone and the like.

When resorcin is used as the compound represented by the general formula (5), a composition composed mainly of the compound represented by the general formula (2) and comprising the compound represented by the general formula (2) and the compound represented by the general formula (3) is obtained.

R in the general formula (3) is the same meaning as R in the general formula (1), and n is an integer of 2-6.

For example, the composition obtained by using resorcin in the above-mentioned reaction and comprising the compound represented by the general formula (2) and the compound represented by the general formula (3) usually includes 60-100 wt % of the compound represented by the general formula (2), 0-20 wt % of the compound represented by the general formula (3) wherein n is 2, 0-10 wt % of the compound represented by the general formula (3) wherein n is 3, and about 10 wt % in total of the compounds represented by the general formula (3) wherein n is 4-6. The ratio of these compounds can be controlled by adjusting a molar ratio of the compound represented by the general formula (4) to resorcin.

Also, the composition comprising the compound represented by the general formula (2) and the compound represented by the general formula (3) can be isolated from the reaction mixture containing them in the same manner as in the isolation method of the compound represented by the general formula (1).

In case that the composition contains not less than 60 wt % of the compound represented by the general formula (2), the humidity-aged adhesion when being compounded with rubber and adhered is improved. In view of the improvement of the humidity-aged adhesion, the content of the compound represented by the general formula (2) is more preferably 70-100 wt %, further preferably 80-100 wt %.

When the compound represented by the general formula (1) is compounded into the rubber composition according to the invention, the amount of the compound represented by the general formula (1) is within a range of 0.1-10 parts by mass, preferably within a range of 0.3-6 parts by mass based on 100 parts by mass of the rubber component. When the amount of the compound represented by the general formula (1) is not less than 0.1 part by mass, the humidity-aged adhesion of the rubber composition is preferably improved, while when it is not more than 10 parts by mass, the blooming of the compound represented by the general formula (1) can be preferably suppressed.

When the composition comprising the compound represented by the general formula (2) and the compound represented by the general formula (3) is compounded into the rubber composition according to the invention, the amount of the said composition is within a range of 0.1-10 parts by mass, preferably within a range of 0.3-6 parts by mass based on 100 parts by mass of the rubber component. When the amount of the composition mainly containing the compound represented by the general formula (2) is not less than 0.1 part by mass, the humidity-aged adhesion of the rubber composition is preferably improved, while when it is not more than 10 parts by mass, the blooming of the composition mainly containing the compound represented by the general formula (2) can be preferably suppressed.

The rubber composition according to the invention may be further compounded with an organic acid cobalt salt. As the organic acid cobalt salt are mentioned, for example, cobalt naphthenate, cobalt stearate, cobalt neodecanoate, rosin acid cobalt salt, versatic acid cobalt salt, tall oil acid cobalt salt and the like. The organic acid cobalt salt may be a composite salt in which a part of the organic acid is substituted with a boric acid or the like. Concretely, Manobond (Trademark: manufactured by OMG) or the like may be mentioned. The amount of the organic acid cobalt salt is preferable to be within a range of 0.03-1 part by mass as a cobalt amount based on 100 parts by mass of the rubber component. When the amount of the organic acid cobalt salt is not less than 0.03 part by mass, adhesion between the rubber composition and the metal reinforcing material is improved, while when it is not more than 1 part by mass, the aging of the rubber composition is suppressed.

In addition to the above compound or composition, rubber component, sulfur and organic acid cobalt salt, the rubber composition of the invention may be properly compounded with common amounts of additives usually used in the rubber industry such as a filler, e.g. carbon black, silica or the like, a softener, e.g. aromatic oil or the like, a methylene doner, e.g. hexamethylene tetramine, methoxymethylated melamine such as pentamethoxymethyl melamine, hexamethylenemethyl melamine or the like, a vulcanization accelerator, an accelerator activator, an antioxidant and so on. The preparation method of the rubber composition according to the invention is not particularly limited, but the rubber composition can be prepared by milling the rubber component with the above compound or composition, the sulfur, the organic acid cobalt salt and the various additives with a Banbury mixer, a roll or the like.

The metal reinforcing material to be adhered with the rubber composition of the invention is preferable to be plated with brass, zinc or their nickel or cobalt containing metal and particularly preferable to be plated with brass for improving the adhesion with rubber.

The rubber composition according to the invention can significantly improve the adhesion to the metal reinforcing material as an adhesion improver in the direct vulcanization adhesion. Thus, the compound represented by the general formula (2) as well as the composition containing 60-100 wt % of the compound represented by the general formula (2), 0-20 wt % of a compound represented by the general formula (3) in which n is 2, 0-10 wt % of a compound represented by the general formula (3) in which n is 3 and 0-10 wt % of a compound represented by the following formula (3) in which n is 4-6 are useful as an adhesion improver.

The compound and the composition containing such a compound as a main component to be compounded into the rubber composition of the invention have a characteristic of easily mixing with the rubber component as compared with resorcin or the RF resin. Therefore, the rubber composition comprising the compound and the composition containing such a compound as a main component tends to hardly cause the blooming as compared with the rubber composition comprising resorcin or the RF resin. This is presumed due to the fact that the compound and the composition containing such a compound as a main component to be compounded into the rubber composition of the invention are low in the polarity as compared with resorcin and the RF resin. Furthermore, the rubber composition according to the invention is small in the change with the lapse of time and develops stable adhesion irrespectively of the storage period.

Next, the pneumatic tire of the invention will be described in detail with reference to the drawing. FIG. 1 is a cross-sectional view of an example of the pneumatic tire according to the invention, wherein numeral 1 is a tread portion, numeral 2 a pair of side wall portions extending inward from both sides of the tread 1 in the radial direction, and numeral 3 a bead portion connecting to an inner end of the side wall portion 2 in the radial direction.

A carcass 4 forming a bone structure of the tire and reinforcing the above portions 1, 2 and 3 of the tire is comprised of at least one carcass ply and has a main body portion toroidally extending between a pair of bead cores 5 embedded in the respective bead portions 3 and a turnup portion wound around the each bead core 5 from an inside to an outside in the widthwise direction of the tire. Although the carcass 4 in the FIGURE is composed of one carcass ply, the number of the carcass plies may be plural in the pneumatic tire of the invention.

Moreover, numeral 6 is a belt. The belt 6 is comprised of at least one belt layer disposed on a crown portion of the carcass 4 outward in a radial direction of the tire. Although the belt 6 in the FIGURE is comprised of two belt layers, the number of the belt layers is not limited thereto in the pneumatic tire of the invention.

In this pneumatic tire, at least one of the carcass 4 and the belt 6 includes a layer composed of steel cords covered with a coating rubber. That is, at least one carcass ply of the carcass 4 and/or at least one belt layer of the belt 6 is sufficient to be the steel cord layer, and two or more carcass plies and two or more belt layers may be the steel cord layer.

Here, the above-mentioned rubber composition is used as a coating rubber covering the steel cords in at least one of the carcass and the belt. Since the above rubber composition is used as the coating rubber for the steel cord layer in at least one of the carcass and the belt constituting the pneumatic tire of the invention, the tire is high in the processability during the manufacture and is also high in the durability.

The carcass ply and the belt layer can be formed by shaping the rubber composition, which is prepared by milling the rubber component with the above compound or the composition containing such a compound as a main component, sulfur, the organic acid cobalt salt and various additives, into a sheet through rolls or the like and further conducting the shaping process at a state of sandwiching steel cords between the resulting two rubber sheets. The thus formed belt layer is disposed on the carcass outward in the radial direction of the tire according to the usual manner to constitute the pneumatic tire of the invention together with the other parts. In the treading portion, sidewall portion, bead portion and the like in the pneumatic tire of the invention can be properly adopted the same material, form and arrangement as used in these portions of the usual tire.

The steel cord to be adhered with the rubber composition used for at least one of the carcass and the belt of the pneumatic tire of the invention is preferable to be plated with brass, zinc or their nickel or cobalt containing metal, and is particularly preferable to be plated with brass for improving the adhesion with rubber. Also, the size, twisting number, twisting conditions and the like of the cord are properly selected in accordance with the performances required in the tire.

EXAMPLES

The following examples are given in illustration of the invention and are not intended as limitations thereof.

Production Example 1

A solution of 330.6 g (3.0 mol) of resorcin in 600.0 g of pyridine is kept below 15° C. on an ice bath, and 54.9 g (0.30 mol) of adipoyl chloride is gradually dropped thereinto. After the dropping, the temperature of the resulting reaction mixture is raised to room temperature and left to stand over a whole day and night to complete the reaction. From the reaction mixture is distilled off pyridine under a reduced pressure, and the resulting residue is added with 1200 g of water and cooled on ice to precipitate a deposit. The precipitated deposit is filtered and washed with water, and the thus obtained wet body is dried under a reduced pressure to obtain 84 g of a white-light yellow powder. The powder is treated by a liquid chromatography provided with a preparative unit under the following conditions to batch off an elute containing a primary component. A crystal precipitated by the concentration of the elute is recovered by filtration and dried under a reduced pressure to obtain a crystal having a melting point of 140-143° C. As a result of an analysis, this crystal is bis(3-hydroxyphenyl) adipate.

The conditions of the preparative HPLC are as follows:
Column: Shim-pack PREP-ODS (made by SHIMADZU Corporation)
Column temperature: 25° C.
Eluting solution: methanol/water mixed solvent (85/15 (w/w %))
Flow rate of eluting solution: 3 ml/min
Detector: UV detector (254 nm).

Moreover, the identification data of bis(3-hydroxyphenyl) adipate are as follows:
Datum of MS Spectrum
EI(Pos.) m/z=330
Data of IR Spectrum
3436 cm$^{-1}$: hydroxyl group
2936 cm$^{-}$: alkyl
1739 cm$^{-}$: ester
Data of NMR spectra are shown in Table 1-1 and Table 1-2.

TABLE 1-1

C-NMR

| Symbol | Measured Value (ppm) |
|---|---|
| ① | 23.7 |
| ② | 33.1 |
| ③ | 109 |
| ④ | 112.1 |
|   | 112.8 |
| ⑤ | 129.8 |
| ⑥ | 151.4 |
| ⑦ | 158.2 |
| ⑧ | 171.5 |

TABLE 1-2

H-NMR

| Symbol | Measured Value (ppm) | Attribution | Proton Ratio |
|---|---|---|---|
| a | 1.7 | —CH2— | 2 |
| b | 2.6 | —CH2— | 2 |
| c | 6.4-6.7 | =CH | 3 |
| d | 7.2 | =CH | 1 |
| e | 9.7 | —OH | 1 |

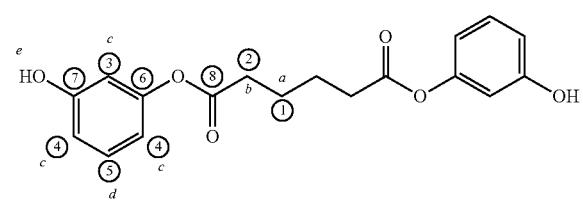

Production Example 2

As a result of HPLC analysis on 84 g of powder obtained by conducting the same reaction as in Production Example 1, a content of bis(3-hydroxyphenyl) adipate in the powder is 89 wt %. The powder further contains 7 wt % of a compound of n=2 in a compound represented by the following formula (6) (hereinafter may be referred to as an oligomer), 2 wt % of a compound of n=3 in the compound represented by the formula (6), and 2 wt % of resorcin as a starting material. The compound represented by the formula (6) is identified by LC-MS.

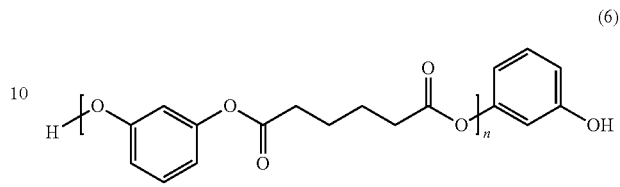

(6)

The measurement conditions of the MS spectrum are shown as follows:
Range of mass: 200-2000 amu (1.98+0.02 sec)
Ionization method: ESI (Electrospray)
Mode: positive
Capillary: 3.15 kV
Cone: 35V
S. B. Tmp.: 150° C.
Deslv. tmp.: 400° C.
Multi: 650 V
N2: 750 L/hr
n=2: 551.1 [M+H]+, 568.2 [M+NH4]+
n=3: 771.2 [M+H]+, 788.2 [M+NH4]+
n=4: 1008.3 [M+NH4]+
n=5: 1228.3 [M+NH4]+

The analytical conditions of the HPLC are shown as follows:
1. Analysis of bis(3-hydroxyphenyl) adipate and resorcin
Column: A-312 ODS from YMC Company
Column temperature: 40° C.
Eluting solution: methanol/water=7/3 (pH is adjusted to 3 with phosphoric acid)
Detection: UV (254 nm).
2. Analysis of the oligomer
Column: A-312 ODS from YMC Company
Column temperature: 40° C.
Eluting solution: acetonitrile/water=8/2 (pH is adjusted to 3.5 with acetic acid)
Detection: UV (254 nm).

Production Example 3

The same procedure as in Production Example 1 is repeated except that the amount of resorcin is 176.2 g (1.6 mol), the amount of pyridine is 400 g and the amount of adipoyl chloride is 73.2 g (0.40 mol) to obtain 118.6 g of powder. As a result of the HPLC analysis, the powder contains 73.4 wt % of bis(3-hydroxyphenyl) adipate, 13.9 wt % of the compound of n=2 represented by the formula (6), 3.0 wt % of the compound of n=3 represented by the formula (6), 0.8 wt % of the compound of n=4 represented by the formula (6), 0.2 wt % of the compound of n=5 represented by the formula (6) and 2.9 wt % of resorcin as a starting material.

Production Example 4

A solution of 440.4 g (4.0 mol) of resorcin in 405.0 g of pyridine is kept below 15° C. on an ice bath, and 62.0 g (0.4 mol) of succinyl dichloride is gradually dropped into the solution. After the dropping, the temperature of the resulting reaction mixture is raised to room temperature and left to stand over a whole day and night to complete the reaction. From the reaction mixture is distilled off pyridine under a reduced pressure, and the resulting residue is added with 1800 g of water and cooled on ice, during which the liquid becomes clouded wholly and separates into two phases. The extraction is carried out by adding 200 g of water and 600 g of ethyl acetate to an oil phase. The resulting organic phase is washed five times with cold water and then dried with magnesium sulfate. Thereafter, ethyl acetate is distilled off to obtain a viscous body, which is crystallized by adding 500 g of toluene, filtered, washed with toluene and then subjected to sludging twice with 1 L of water. The resulting wet body is dissolved into 100 g of methanol, re-precipitated by adding 1 L of water, filtered, washed and dried to obtain 82.3 g of light yellow powder. As a result of the HPLC analysis, a primary component of the powder is found to be a component having 91.0 area %. Also, the powder contains 0.7 wt % of resorcin. As a result of structural analysis, the primary component of the powder is found to be bis(3-hydroxyphenyl) succinate.

Moreover, identification data of bis(3-hydroxyphenyl) succinate are shown as follows:

Datum of MS Spectrum
EI(Pos.) m/z=302
Data of IR Spectrum
3361 cm$^{-1}$: hydroxyl group
2984 cm$^{-1}$: alkyl
1732 cm$^{-1}$: ester
Data of NMR spectra are shown in Table 2-1 and Table 2-2.

TABLE 2-1

C-NMR

| Symbol | Measured Value (ppm) |
|---|---|
| ① | 30.1 |
| ② | 109.9 |
| ③ | 113.5 |
|   | 114 |
| ④ | 130.8 |
| ⑤ | 153.1 |
| ⑥ | 159.6 |
| ⑦ | 172.7 |

TABLE 2-2

H-NMR

| Symbol | Measured Value (ppm) | Attribution | Proton Ratio |
|---|---|---|---|
| a | 3 | —CH2CH2— | 4 |
| b | 6.5-6.7 | =CH | 6 |
| c | 7.2 | =CH | 2 |

Production Example 5

A solution of 330.3 g (3.0 mol) of resorcin in 303.7 g of pyridine is kept below 15° C. on an ice bath, and 71.7 g (0.3 mol) of sebacoyl dichloride is gradually dropped into the solution. After the dropping, the temperature of the resulting reaction mixture is raised to room temperature and left to stand over a whole day and night to complete the reaction. From the reaction mixture is distilled off pyridine under a reduced pressure, and the resulting residue is added with 250 g of water and cooled on ice to precipitate a deposit. The precipitated deposit is filtered and washed with water, and the resulting wet body is dried under a reduced pressure to obtain 102.8 g of a white-light yellow powder. As a result of the HPLC analysis, a primary component of the powder is found to be a component having 98.7 area %. Also, the powder contains 0.2 wt % of resorcin. As a result of structural analysis, the primary component of the powder is found to be bis(3-hydroxyphenyl) sebacate.

Moreover, identification data of bis(3-hydroxyphenyl) sebacate are shown as follows:

Datum of MS Spectrum

EI(Pos.) m/z=386

Data of IR Spectrum 3380 cm$^{-1}$: hydroxyl group 3000-2800 cm$^{-1}$: long chain alkyl 1732, 1749 cm$^{-1}$: ester Data of NMR spectra are shown in Table 3-1 and Table 3-2.

TABLE 3-1

C-NMR

| Symbol | Measured Value (ppm) |
|---|---|
| ① | 26 |
| ② | 30.1 |
|   | 30.2 |
| ③ | 34.96 |
|   | 34.05 |
| ④ | 110 |
| ⑤ | 113.5 |
|   | 113.8 |
| ⑥ | 130.8 |
| ⑦ | 153.2 |
| ⑧ | 159.6 |
| ⑨ | 174 |

TABLE 3-2

H-NMR

| Symbol | Measured Value (ppm) | Attribution | Proton Ratio |
|---|---|---|---|
| a | 1.4 | —CH2— | 8 |
| b | 1.7 | —CH2— | 4 |
| c | 2.6 | —CH2— | 4 |
| d | 6.4-6.7 | =CH | 6 |
| e | 7.2 | =CH | 2 |

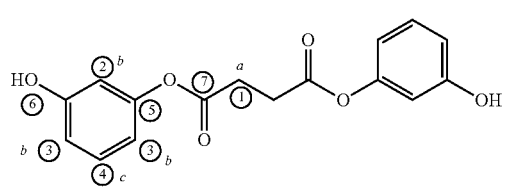

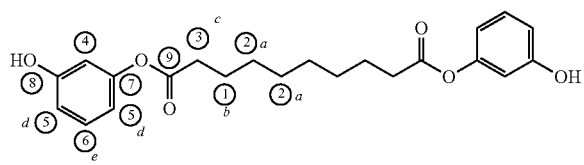

Production Example 6

A solution of 440.4 g (4.0 mol) of resorcin in 405 g of pyridine is kept below 15° C. on an ice bath, and a liquid of 81.2 g (0.4 mol) of terephthaloyl dichloride suspended in 180 g of toluene is gradually dropped into the solution. After the dropping, the temperature of the resulting reaction mixture is raised to room temperature and left to stand over a whole day and night to complete the reaction. From the reaction mixture is distilled off pyridine under a reduced pressure, the resulting residue is left to cool, and as a result a precipitates are formed. The resulting precipitates are suspended by adding 300 g of water, discharged into 1 L of water, and the thus obtained precipitates are filtered and washed with water, and the resulting wet body is dried under a reduced pressure to obtain 130.0 g of a beige powder. As a result of the HPLC analysis, a primary component of the powder is found to be a component having 90.7 area %. Also, the powder contains 0.2 wt % of resorcin. As a result of structural analysis, the primary component of the powder is found to be bis(3-hydroxyphenyl) terephthalate.

Production Example 7

A solution of 440.4 g (4.0 mol) of resorcin in 405 g of pyridine is kept below 15° C. on an ice bath, and a suspension of 81.2 g (0.4 mol) of isophthaloyl dichloride in 80 g of toluene is gradually dropped thereinto. After the dropping, the temperature of the resulting reaction mixture is raised to room temperature and left to stand over a whole day and night to complete the reaction. From the reaction mixture is distilled off pyridine under a reduced pressure, and the resulting residue is left to cool, and as a result precipitates are formed. The resulting precipitates are added with 500 g of water, aged with cooling, filtered and washed to obtain a wet body. The resulting wet body is dissolved into 200 g of methanol, discharged into 2 L of water, and the thus obtained precipitates are filtered and washed with water, and the resulting wet body is dried under a reduced pressure to obtain 130.2 g of a beige powder. As a result of the HPLC analysis, a primary component of the powder is found to be a component having 89.4 area %. Also, the powder contains 0.8 wt % of resorcin. As a result of structural analysis, the primary component of the powder is found to be bis(3-hydroxyphenyl) isophthalate.

Examples 1-9

Each of the compositions produced in Production Examples 1-7 is used as a test compound and mixed and milled according to a rubber compounding recipe shown in Table 4 with a Banbury mixer of 2200 mL to prepare an uncured rubber composition, and then the resistance to blooming, Mooney viscosity, adhesion just after the compounding and adhesion after the leaving of compounded rubber are measured and evaluated by the following methods. The results are shown in Table 4.

(1) Resistance to Blooming

After the uncured rubber composition is stocked at 40° C. for 7 days, it is visually observed whether or not the compounding ingredients are separated out on the surface of rubber, which is judged by ○, Δ and x.

○: The compounding ingredient is not separated out on the surface.

Δ: The compounding ingredient is partially separated out on the surface.

X: The compounding ingredient is separated out on the whole surface.

(2) Mooney Viscosity

ML(1+4) 130° C. of the uncured rubber composition is measured according to JIS K6300-2001. The smaller the numerical value, the better the result.

(3) Adhesion Test (Rubber Composition)

Steel cords (1×5 structure, wire diameter: 0.25 mm) plated with brass (Cu: 63 mass %, Zn: 37 mass %) are arranged in parallel to each other at an interval of 12.5 mm and coated with each of the rubber compositions from both sides thereof and immediately vulcanized at 160° C. for 15 minutes to prepare a sample having a width of 12.5 mm. After the steel cord is pulled out from the sample according to ASTM-D-2229 for the following adhesion, the rubber coated state is visually observed and represented by a value of 0-100% as an indicator of the adhesion. The larger the value, the better the property. The initial adhesion is measured just after the vulcanization. The humidity-aged adhesion is measured by aging at 70° C. and a humidity of 100% RH for 4 days after the vulcanization.

(4) Test for Adhesion Stability

A steel cord-rubber composite body of an uncured state formed by coating steel cords with each of the rubber compositions from both sides thereof is left to stand in a constant temperature and humidity chamber of 40° C. and 80% RH for 7 days and then vulcanized at 160° C. for 15 minutes to measure an initial adhesion as an indicator of the adhesion stability.

Comparative Example 1

A rubber composition is prepared according to the same compounding recipe as in the examples except that the compound and the composition obtained in the Production Examples are not used as a test compound and the properties thereof are evaluated. The results are shown in Table 4.

Comparative Example 2

A rubber composition is prepared according to the same compounding recipe as in the examples except that 2 parts by mass of resorcin is compounded in the base rubber formulation as a test compound and the properties thereof are evaluated. The results are shown in Table 4.

Comparative Example 3

A rubber composition is prepared according to the same compounding recipe as in the examples except that 2 parts by mass of RF resin is compounded in the base rubber formulation as a test compound and the properties thereof are evaluated. The results are shown in Table 4. Moreover, the RF resin is prepared by the following method.

At first, 1100 g of water, 1100 g (10 mol) of resorcin and 1.72 g (10 mmol) of p-toluenesulfonic acid are charged into a four-necked flask equipped with a cooling tube, a stirrer, a thermometer, a dropping funnel and a tube for introduction of nitrogen, and then heated to 70° C. 477 g (5.9 mol) of a 37% formalin solution is added dropwise over 2 hours and the temperature is kept for 5 hours to complete the reaction. After the completion of the reaction, 4 g of an aqueous solution of 10% sodium hydroxide is added and neutralized, and thereafter the cooling device is substituted with a Dean-Stack type reflux condenser. Then, the temperature is raised to 150° C. while distilling off water, and further water is removed under a reduced pressure of 20 mmHg over 1 hour to obtain the RF resin. The thus obtained RF resin has a softening point of 124° C. and a residual resorcin content of 17%.

Comparative Example 4

A rubber composition is prepared according to the same compounding recipe as in the Example 1 except that 12 parts by mass of the composition produced in the Production Example 2 is compounded as a test compound and the properties thereof are evaluated. The results are shown in Table 4.

Comparative Example 5

A rubber composition is prepared according to the same compounding recipe as in the examples except that 2 parts by mass of a mixed polyester described in JP-A-7-118621 is compounded in the base rubber formulation as a test compound and the properties thereof are evaluated. The results are shown in Table 4. Moreover, the mixed polyester is prepared according to Example 1 of the above-described publication.

Into a 300 ml four-necked flask equipped with a reflux condenser and a thermometer are charged 108.9 g (0.99 mol) of resorcin, 131.4 g (0.90 mol) of adipic acid, 222.0 g (2.175 mol) of acetic anhydride and 0.54 g (0.5 wt % to resorcin) of pyridine, and the inside of the flask is purged with nitrogen, and then the mixture is stirred at room temperature for 15 minutes and heated to 100° C. and acetylated at this temperature for 2 hours. Thereafter, the system is heated while distilling off a by-product acetic acid from the system, and maturated at 140° C. for 1 hour and further at 240° C. for 2 hours. Then, the maturation is continued at 240° C. under a reduced pressure (50 mmHg). The resulting reaction mixture is discharged onto a porcelain dish to obtain 195.6 g of ocher candy-like body. The candy-like body is gradually crystallized by kneading with a glass rod. As a result of the analysis, the crystal contains 0.1 wt % of resorcin, 0.5 wt % of resorcin monoacetate and 0.8 wt % of resorcin diacetate. As a result of the measurement on the molecular weight through GPC, the weight-average molecular weight is about 30000 (conversion to PS).

TABLE 4

| | | | Example 1 | Example 2 | Example 3 | Example 4 | Example 5 | Example 6 | Example 7 |
|---|---|---|---|---|---|---|---|---|---|
| Formulation | Natural Rubber | parts by mass | 100 | 100 | 100 | 100 | 100 | 100 | 100 |
| | Carbon Black (N326) | | 60 | 60 | 60 | 60 | 60 | 60 | 60 |
| | Sulfur | | 5 | 5 | 5 | 5 | 5 | 5 | 5 |
| | Zinc White | | 5 | 5 | 5 | 5 | 5 | 5 | 5 |
| | Vulcanization Accelerator [1] | | 1 | 1 | 1 | 1 | 1 | 1 | 1 |
| | Antioxidant [2] | | 2 | 2 | 2 | 2 | 2 | 2 | 2 |
| | Cobalt Compound [3] | | 1 | 1 | 1 | 1 | 1 | 1 | 1 |
| | Test Composition | Sort | Production Example 1 | Production Example 2 | Production Example 2 | Production Example 2 | Production Example 3 | Production Example 4 | Production Example 5 |
| | | Amount | 2 | 2 | 0.5 | 8 | 2 | 2 | 2 |
| Evaluation Results | Resistance to blooming | | ○ | ○ | ○ | ○ | ○ | ○ | ○ |
| | ML1 + 4(130° C.) | | 76.4 | 77.1 | 73.1 | 78.8 | 77.3 | 78.5 | 75.0 |
| | Initial adhesion | % | 100 | 100 | 100 | 100 | 100 | 100 | 100 |
| | Humidity-aged adhesion | % | 95 | 90 | 70 | 95 | 90 | 90 | 80 |
| | Adhesion stability | % | 100 | 100 | 100 | 95 | 100 | 100 | 100 |

| | | | Example 8 | Example 9 | Comparative Example 1 | Comparative Example 2 | Comparative Example 3 | Comparative Example 4 | Comparative Example 5 |
|---|---|---|---|---|---|---|---|---|---|
| Formulation | Natural Rubber | parts by mass | 100 | 100 | 100 | 100 | 100 | 100 | 100 |
| | Carbon Black (N326) | | 60 | 60 | 60 | 60 | 60 | 60 | 60 |
| | Sulfur | | 5 | 5 | 5 | 5 | 5 | 5 | 5 |
| | Zinc White | | 5 | 5 | 5 | 5 | 5 | 5 | 5 |
| | Vulcanization Accelerator [1] | | 1 | 1 | 1 | 1 | 1 | 1 | 1 |
| | Antioxidant [2] | | 2 | 2 | 2 | 2 | 2 | 2 | 2 |
| | Cobalt Compound [3] | | 1 | 1 | 1 | 1 | 1 | 1 | 1 |
| | Test Composition | Sort | Production Example 6 | Production Example 7 | None | Resorcin | RF Resin | Production Example 2 | Polyester |
| | | Amount | 2 | 2 | | 2 | 2 | 12 | 2 |
| Evaluation Results | Resistance to blooming | | ○ | ○ | ○ | x | Δ | Δ | ○ |
| | ML1 + 4(130° C.) | | 74.2 | 69.8 | 73.5 | 81.9 | 82.5 | 82.7 | 84.5 |
| | Initial adhesion | % | 100 | 100 | 100 | 100 | 100 | 100 | 100 |
| | Humidity-aged adhesion | % | 70 | 75 | 30 | 90 | 50 | 75 | 50 |
| | Adhesion stability | % | 100 | 100 | 100 | 70 | 75 | 80 | 100 |

[1] N,N'-dicyclohexyl-2-benzothiazyl sulfenamide
[Manufactured by OUCHISHINKO CHEMICAL INDUSTRIAL CO., LTD., Trade name : NOCCELER DZ]
[2] N-phenyl-N'-1,3-dimethylbutyl-p-phenylenediamine
[Manufactured by OUCHISHINKO CHEMICAL INDUSTRIAL CO., LTD., Trade name : NOCRAC 6C]
[3] Manufactured by OMG, Trade name : MANOBOND C22.5, Cobalt content = 22.5 mass %

As seen from Table 4, the rubber compositions in the examples are excellent in the resistance to blooming, high in the initial adhesion and adhesion stability and also the humidity-aged adhesion is considerably improved as compared with Comparative Example 1.

On the other hand, the resorcin-containing rubber composition of Comparative Example 2 is bad in the resistance to blooming, large in the increment of Mooney viscosity with respect to Comparative Example 1, and low in the adhesion stability. Also, the RF resin-containing rubber composition of Comparative Example 3 is inferior in the resistance to blooming to those of the examples, large in the increment of Mooney viscosity with respect to Comparative Example 1, and low in the humidity-aged adhesion and the adhesion stability. Furthermore, the rubber composition compounded with the mixed polyester in Comparative Example 5 is large in the increment of Mooney viscosity with respect to Comparative Example 1 and low in the humidity-aged adhesion.

Moreover, the rubber composition containing 12 parts by mass of the composition produced according to the Production Example 2 in Comparative Example 4 is inferior in the resistance to blooming to those of the examples, large in the increment of Mooney viscosity with respect to Comparative coating rubber in the belt layer of the tire is evaluated by the following method. The results are shown in Table 5 together with the formulation of the rubber composition used.

(5) Evaluation of Humidity-Aged Adhesion (Tire)

After the test tire is left to stand in a constant temperature and humidity chamber of 100° C. and 95% RH over 5 weeks, the belt layer is taken out from the tire, and the steel cord is pulled out from the belt layer at a speed of 50 mm/min by means of a tensile testing machine to visually observe a rubber-covered state of the exposed steel cord, and the coverage is represented by a value of 0-100% as an indicator of the humidity-aged adhesion. The larger the value, the better the property.

(6) Evaluation of Adhesion Stability (Tire)

After the shaped green tire is left to stand in a constant temperature and humidity chamber of 40° C. and 80% RH for 7 days and then vulcanized, the belt layer is taken out from the vulcanized tire, and the steel cord is pulled out from the belt layer at a speed of 50 mm/min by means of a tensile testing machine to visually observe a rubber-covered state of the exposed steel cord, and the coverage is represented by a value of 0-100% as an indicator of the adhesion stability.

TABLE 5

| | | | Example 1 | Example 2 | Example 3 | Example 4 | Example 5 | Example 6 | Example 7 |
|---|---|---|---|---|---|---|---|---|---|
| Formulation | Natural Rubber | parts | 100 | 100 | 100 | 100 | 100 | 100 | 100 |
| | Carbon Black (N326) | by | 60 | 60 | 60 | 60 | 60 | 60 | 60 |
| | Sulfur | mass | 5 | 5 | 5 | 5 | 5 | 5 | 5 |
| | Zinc White | | 5 | 5 | 5 | 5 | 5 | 5 | 5 |
| | Vulcanization Accelerator [1] | | 1 | 1 | 1 | 1 | 1 | 1 | 1 |
| | Antioxidant [2] | | 2 | 2 | 2 | 2 | 2 | 2 | 2 |
| | Cobalt Compound [3] | | 1 | 1 | 1 | 1 | 1 | 1 | 1 |
| | Test Composition Sort | | Production Example 1 | Production Example 2 | Production Example 2 | Production Example 2 | Production Example 3 | Production Example 4 | Production Example 5 |
| | Amount | | 2 | 2 | 0.5 | 8 | 2 | 2 | 2 |
| Evaluation | Humidity-aged adhesion (tire) | % | 95 | 90 | 80 | 95 | 90 | 90 | 85 |
| | Adhesion stability (tire) | % | 100 | 100 | 100 | 95 | 100 | 100 | 100 |

| | | | Example 8 | Example 9 | Comparative Example 1 | Comparative Example 2 | Comparative Example 3 | Comparative Example 4 | Comparative Example 5 |
|---|---|---|---|---|---|---|---|---|---|
| Formulation | Natural Rubber | parts | 100 | 100 | 100 | 100 | 100 | 100 | 100 |
| | Carbon Black (N326) | by | 60 | 60 | 60 | 60 | 60 | 60 | 60 |
| | Sulfur | mass | 5 | 5 | 5 | 5 | 5 | 5 | 5 |
| | Zinc White | | 5 | 5 | 5 | 5 | 5 | 5 | 5 |
| | Vulcanization Accelerator [1] | | 1 | 1 | 1 | 1 | 1 | 1 | 1 |
| | Antioxidant [2] | | 2 | 2 | 2 | 2 | 2 | 2 | 2 |
| | Cobalt Compound [3] | | 1 | 1 | 1 | 1 | 1 | 1 | 1 |
| | Test Composition Sort | | Production Example 6 | Production Example 7 | None | Resorcin | RF Resin | Production Example 2 | Polyester |
| | Amount | | 2 | 2 | | 2 | 2 | 12 | 2 |
| Evaluation | Humidity-aged adhesion (tire) | % | 75 | 80 | 50 | 90 | 60 | 80 | 60 |
| | Adhesion stability (tire) | % | 100 | 100 | 100 | 70 | 75 | 80 | 100 |

[1] N,N'-dicyclohexyl-2-benzothiazyl sulfenamide
[Manufactured by OUCHISHINKO CHEMICAL INDUSTRIAL CO., LTD., Trade name : NOCCELER DZ]
[2] N-phenyl-N'-1,3-dimethylbutyl-p-phenylenedamine
[Manufactured by OUCHISHINKO CHEMICAL INDUSTRIAL CO., LTD., Trade name : NOCRAC 6C]
[3] Manufactured by OMG, Trade name : MANOBOND C22.5, Cobalt content = 22.5 mass %

Example 1, and poor in the adhesion stability as compared with those of the examples. Thus, the amount of the above-mentioned composition must be within the range of 0.1-10 parts by mass based on 100 parts by mass of the rubber component.

Then, a belt layer is formed by covering steel cords with the rubber composition prepared as stated above, and then a radial tire comprising such a belt layer and having a tire size of 185/70 R14 is prepared according to the usual manner, and thereafter the adhesion between the steel cord and the As seen from Table 5, the tires using the resorcin or RF resin-containing rubber composition as the coating rubber for the belt layer in Comparative Examples 2 and 3 improve the humidity-aged adhesion as compared with the tire of Comparative Example 1, but are large in the increment of Mooney viscosity in the rubber composition used for the coating rubber and poor in the resistance to blooming and deteriorate the adhesion stability. Also, the tire using the rubber composition compounded with the mixed polyester as the coating rubber for the belt layer in Comparative Example 5 is insufficient in the humidity-aged adhesion.

On the contrary, the tires using the rubber compositions compounded with the compositions produced in the production examples as the coating rubber for the belt layer in the examples suppress the rise of Mooney viscosity as compared with the tire of Comparative Example 1 and improve the humidity-aged adhesion and adhesion stability.

As seen from the results of Examples 2-4 and Comparative Example 4, there is a tendency that the Mooney viscosity of the rubber composition rises and the processability lowers as the amount of the composition produced in the production examples increases, so that the amount of the composition produced by the production example must be within the range of 0.1-10 parts by mass based on 100 parts by mass of the rubber component.

The invention claimed is:

1. A method for producing a pneumatic tire comprising a carcass comprised of at least one carcass ply and a belt disposed on the carcass outward in a radial direction of the tire and comprised of at least one belt layer; wherein at least one of the carcass and the belt includes a layer composed of steel cords covered with a coating rubber, the method comprising the step of using a rubber composition as the coating rubber covering the steel cords in at least one of the carcass and the belt, wherein the rubber composition is produced by a method comprising the steps of:

reacting a dicarboxylic acid halide represented by the following general formula (4):

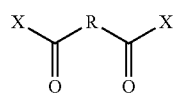

(4)

wherein R is a divalent aliphatic group having a carbon number of 1-16 or a divalent aromatic group, and X is a halogen atom,
with resorcin to form a reaction mixture;
isolating a compound represented by the following general formula (2):

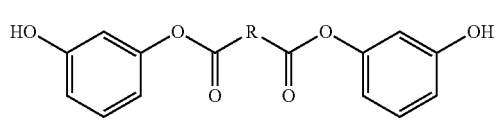

(2)

wherein R represents a divalent aliphatic group having a carbon number of 1-16 or a divalent aromatic group,
from the reaction mixture; and
compounding 1-10 parts by mass of sulfur and 0.1-10 parts by mass of the isolated compound represented by the general formula (2) into 100 parts by mass of a rubber component.

2. A method for producing a pneumatic tire comprising a carcass comprised of at least one carcass ply and a belt disposed on the carcass outward in a radial direction of the tire and comprised of at least one belt layer; wherein at least one of the carcass and the belt includes a layer composed of steel cords covered with a coating rubber, the method comprising the step of using a rubber composition as the coating rubber covering the steel cords in at least one of the carcass and the belt, wherein the rubber composition is produced by a method comprising the steps of:

reacting a dicarboxylic acid halide represented by the following general formula (4):

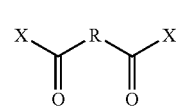

(4)

wherein R is a divalent aliphatic group having a carbon number of 1-16 or a divalent aromatic group, and X is a halogen atom,
with resorcin to form a reaction mixture;
isolating a composition containing (i) 60-100 wt % of a compound represented by the following general formula (2):

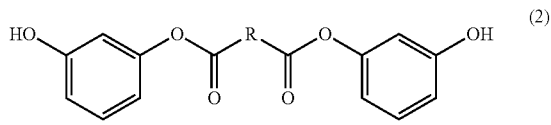

(2)

wherein R represents a divalent aliphatic group having a carbon number of 1-16 or a divalent aromatic group, and (ii) optionally at least one compound represented by the following general formula (3):

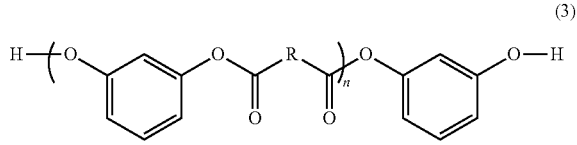

(3)

wherein R is a divalent aliphatic group having a carbon number of 1-16 or a divalent aromatic group, and n is an integer of 2-6, including 0-20 wt % of a compound represented by the general formula (3) in which n is 2, 0-10 wt % of a compound represented by the general formula (3) in which n is 3, and 0-10 wt % of a compound represented by the general formula (3) in which n is 4-6,
from the reaction mixture; and
compounding 1-10 parts by mass of sulfur and 0.1-10 parts by mass of the isolated composition containing 60-100 wt % of the compound represented by the general formula (2), 0-20 wt % of the compound represented by the general formula (3) in which n is 2, 0-10 wt % of the compound represented by the general formula (3) in which n is 3 and 0-10 wt % of the compound represented by the general formula (3) in which n is 4-6 into 100 parts by mass of a rubber component.

* * * * *